United States Patent
Xiong

(10) Patent No.: US 9,291,867 B2
(45) Date of Patent: Mar. 22, 2016

(54) DOUBLE LAYER LIQUID CRYSTAL (LC) FABRY-PEROT (FP) FILTER DISPLAY DEVICE

(71) Applicant: Shenzhen China Star Optoelectronics Technology Co., Ltd., Shenzhen, Guangdong (CN)

(72) Inventor: Yuan Xiong, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 107 days.

(21) Appl. No.: 14/235,070

(22) PCT Filed: Jul. 11, 2013

(86) PCT No.: PCT/CN2013/079250
§ 371 (c)(1),
(2) Date: Jan. 26, 2014

(87) PCT Pub. No.: WO2015/000191
PCT Pub. Date: Jan. 8, 2015

(65) Prior Publication Data
US 2015/0009450 A1    Jan. 8, 2015

(30) Foreign Application Priority Data
Jul. 2, 2013   (CN) .......................... 2013 1 0274521

(51) Int. Cl.
G02F 1/1347   (2006.01)
G02F 1/1333   (2006.01)
G02F 1/21     (2006.01)

(52) U.S. Cl.
CPC .......... *G02F 1/13473* (2013.01); *G02F 1/1347* (2013.01); *G02F 1/133377* (2013.01); *G02F 2001/213* (2013.01)

(58) Field of Classification Search
CPC .................... G02F 1/133514; G02F 1/133521; G02F 1/133
USPC ....................... 349/104, 105, 61, 62
See application file for complete search history.

(56) References Cited

U.S. PATENT DOCUMENTS 5,321,539 A * 6/1994 Hirabayashi ............ G02F 1/216
   349/1
5,469,279 A * 11/1995 Sharp et al. ...................... 349/74

(Continued)

FOREIGN PATENT DOCUMENTS

CN     102799013      * 11/2012
KR     WO 00/26720    *  5/2000  ............... G02F 1/21

*Primary Examiner* — Sang V Nguyen
(74) *Attorney, Agent, or Firm* — Andrew C. Cheng

(57) ABSTRACT

A double layer LC FP filter display device includes a backlight module (4) and a double layer LC FP filter module (2) arranged above the backlight module. The double layer LC FP filter module (2) includes a plurality of main pixels (402) arranged in a matrix. Each of the main pixels (402) comprises two sub-pixels (204). Each of the sub-pixels (204) includes one up-layer LC FP filter units (220) and one down-layer LC FP filter units (240) stacked together. The two sub-pixels (204) of the main pixels (402) are independently driven such that transmission light having two chromaticity is obtained when the white transmission light having the continuous spectrum provided by the backlight module (4) passes through the two sub-pixels (204). The chromaticity of the main pixels (402) is obtained by mixing the transmission light having two chromaticity.

12 Claims, 6 Drawing Sheets

(56) References Cited

U.S. PATENT DOCUMENTS

| | | | |
|---|---|---|---|
| 6,707,518 B1* | 3/2004 | Cowan | 349/113 |
| 2004/0227455 A1* | 11/2004 | Moon et al. | 313/501 |
| 2006/0262250 A1* | 11/2006 | Hobbs | G02B 5/1809 349/96 |
| 2007/0070008 A1* | 3/2007 | Shin et al. | 345/89 |
| 2013/0077029 A1* | 3/2013 | Nagato | G02B 5/201 349/105 |
| 2013/0100378 A1* | 4/2013 | Murata | G02F 1/133528 349/61 |

* cited by examiner

DOUBLE LAYER LIQUID CRYSTAL (LC) FABRY-PEROT (FP) FILTER DISPLAY DEVICE

BACKGROUND OF THE INVENTION

1. Field of the Invention

The present disclosure relates to liquid crystal display technology, and more particularly to a double layer LC FP Filter display device.

2. Discussion of the Related Art

Liquid crystal displays (LCDs) typically are characterized by attributes including thin, power-saving, and low radiation. Thus, the LCDs are widely adopted by a plurality of electronic devices, such as mobile phones, PDA, digital cameras, displays of personal computers or notebooks.

Currently, most of the LCDs are backlight-type LCDs. Generally, the LCDs include a housing, a liquid crystal panel and a backlight module arranged within the housing. The liquid crystal panel includes a color filtering array substrate, a Thin Film Transistor (TFT) Array Substrate, and a liquid crystal layer arranged therebetween. By applying driving voltages toward the two substrates to control the alignment of the liquid crystal, the light beams from the backlight module are reflected so as to display images. As the liquid crystal does not emit light beams itself, the backlight module is needed to provide the light source so as to display images. Thus, the backlight module is a key component of the LCDs. Generally, backlight modules can be classified into edge-type and direct-lit type according to the incident locations of the light source. Regarding the direct-lit type backlight module, the Cold Cathode Fluorescent Lamp (CCFL) or Light Emitting Diode (LED) are arranged behind the liquid crystal panel to form a surface light source. With respect to the edge-type backlight module, the LED light bars are arranged at lateral rear sides of the liquid crystal panel. The light beams emitted from the LED light bar enter one side of the Light Guide Plate (LGP). After being reflected and diffused, the light beams emit out from the light emitting surface and then operates as the surface light source of the liquid crystal panel.

FIG. 1 is an exploded view of the conventional LCD. The LCD includes a backlight module 100, a plastic frame 300 arranged above the backlight module 100, and a liquid crystal panel 500 arranged above the plastic frame 300, and a front frame 700 arranged above the liquid crystal panel 500. The backlight module 100 provides a uniform-radiated surface light source for the liquid crystal panel 500. The plastic frame 300 is for carrying the liquid crystal panel 500. The front frame 700 is for fixing the liquid crystal panel on the plastic frame 300.

FIG. 2 is a schematic view of the conventional liquid crystal panel. The liquid crystal panel includes a thin film transistor (TFT) substrate 502, a color filtering substrate 504 arranged opposite to the TFT substrate 502, a liquid crystal layer 506 arranged between the TFT substrate 502 and the color filtering substrate 504, and a first and a second polarizers 522, 542 respectively attaches to the TFT substrate 502 and the color filtering substrate 504. After being polarized by the first polarizer 522, the light beams from the backlight module enter the liquid crystal layer 506. Afterward, the polarized light beams selected by the liquid crystal layer 506 enter the color filtering substrate 504. A color filtering sheet 544 of the color filtering substrate 504 tunes the color of the light beams. The light beams are then polarized by the second polarizer 542 and are emitted out to display colorful images.

However, the polarizers and the color filtering sheet are key factors to the backlight efficiency. The overall optical efficiency may be in the range of between 5% to 10%. At the same time, the color range is also restricted by a color coordinate of the RGB color filtering sheet.

In order to overcome the above problems, FIG. 3 shows a conventional double layer liquid crystal FP filter display device ("display device"). The display device includes a backlight module 30, and a pixelated double layer LC FP filter module. The backlight module 30 includes a plurality of LED light bars 38 having RGB LED chips, a light guiding plate 36, a diffusion plate 34, and a transmission enhanced film 32. The backlight module 30 is for providing the backlight for the pixelated double layer LC FP filter module. The pixelated double layer LC FP filter module includes a first pixelated single-layer LC FP filter module 10 and a second pixelated double-layer LC FP filter module 20. Each of the filter modules include a plurality of pixel cells being arranged in an array. The pixel cells in each layers are independently driven to emit pixels with an non-shifted central wavelength. The pixelated double-layer LC FP filter module is for modulating the grayscale and the color of the backlight.

Referring to FIG. 4, the pixel cell includes a first substrate 111 and a second substrate 112 respectively arranged above and below the pixel cell, an up multi-layer dielectric reflective layer 113, a down multi-layer dielectric reflective layer 114, and a LC layer between the up multi-layer dielectric reflective layer 113 and the down multi-layer dielectric reflective layer 114. The LC layer is divided into a red pixel LC layer 152, a green pixel LC layer 154, and a blue pixel LC layer 156 by an insulated layer 150. A red pixel upper-layer electrode and a driving circuit 162, a green pixel upper-layer electrode and the driving circuit 164, and a blue pixel upper-layer electrode and the driving circuit 166 are arranged between the first substrate 111 and the second substrate 112 for providing driving voltage to the red pixel LC layer 152, the green pixel LC layer 154, and the blue pixel LC layer 156. During operations, the pixels opposite to each other in a vertical direction are supplied with different voltages by respective driving circuit such that the transmission spectrum of one pixel shifts toward the long wavelength and that of the other pixel shifts toward the short wavelength. Thus, the sub-pixels with non-shifted central wavelength is obtained by overlapping the projected transmission spectrums. In this way, the backlight grayscale is adjusted and the central wavelength of the emitted light beams is not shifted such that the backlight efficiency is enhanced.

However, as the transmission peak wavelength of one single sub-pixel corresponds to the central wavelength of the LED light bar of the backlight module, the peak wavelength of the transmission spectrum and the transmission rate of the sub-pixel cannot be adjusted. In addition, the transmission peak wavelengths of the sub-pixels relate to mixing the three primary color. The color range is small and cannot meet consumers' demand.

SUMMARY

The object of the invention is to provide a double layer LC FP Filter display device. The display device has a high optical performance, a wide color range, a simple structure, and a low cost.

In one aspect, a double layer liquid crystal (LC) Fabry-Perot (FP) filter display device includes: a backlight module and a double layer LC FP filter module arranged above the backlight module, the backlight module provides white transmission light with continuous spectrum for the double layer LC FP filter module, the double layer LC FP filter module includes an up-layer LC FP filter module and a down-layer LC FP filter module, the up-layer LC FP filter module includes a plurality of up-layer LC FP filter units, the down-layer LC FP filter module includes a plurality of down-layer LC FP filter units, the double layer LC FP filter module includes a plurality of main pixels arranged in a matrix, each of the main pixels includes two sub-pixels, each of the sub-pixels includes one up-layer LC FP filter units and one down-layer LC FP filter units stacked together, the two sub-pixels of the main pixels are independently driven such that transmission light having two chromaticity is obtained when the white transmission light having the continuous spectrum provided by the backlight module passes through the two sub-pixels, and the chromaticity of the main pixels is obtained by mixing the transmission light having the two chromaticity.

The up-layer LC FP filter unit includes a first down-layer glass substrate, a first down-layer electrode and a driving circuit arranged above the first down-layer glass substrate, a first down-layer multi-layer dielectric reflective film arranged above the first down-layer electrode and the driving circuit, a first down-layer alignment film arranged above the first down-layer multi-layer dielectric reflective film, a first LC layer arranged above the first down-layer alignment film, a first up-layer alignment film arranged above the first LC layer, a first up-layer multi-layer dielectric reflective film arranged above the first up-layer alignment film, a first up-layer electrode arranged above the first up-layer multi-layer dielectric reflective film, and a first up-layer glass substrate arranged above the first up-layer electrode.

The down-layer LC FP filter units includes a second down-layer glass substrate, a second down-layer electrode and the driving circuit arranged above the second down-layer glass substrate, a second down-layer multi-layer dielectric reflective film arranged above the second down-layer electrode and the driving circuit, a second down-layer alignment film arranged above the second down-layer multi-layer dielectric reflective film, a second LC layer arranged above the second down-layer alignment film, a second up-layer alignment film arranged above the second LC layer, a second up-layer multi-layer dielectric reflective film arranged above the second up-layer alignment film, a second up-layer electrode arranged above the second up-layer multi-layer dielectric reflective film, and a second up-layer glass substrate arranged above the second up-layer electrode.

A pretilt direction of the liquid crystal in the first LC layer is opposite to the pretilt direction of the liquid crystal in the second LC layer.

Further includes a transmission enhanced film arranged between the backlight module and the double layer LC FP filter modules.

A first insulation layer is arranged between the first LC layers of the up-layer LC FP filter units of two adjacent sub-pixels.

A second insulation layer is arranged between the second LC layers of the down-layer LC FP filter units of two adjacent sub-pixels.

The backlight module includes a backlight source and a light guiding plate, the backlight source emits white lights with continuous spectrum, and after passing through the light guiding plate, the white transmission light having continuous spectrum is provided to the double layer LC FP filter module.

In another aspect, a double layer LC FP filter display device includes: a backlight module and a double layer LC FP filter module arranged above the backlight module, the backlight module provides white transmission light with continuous spectrum for the double layer LC FP filter module, the double layer LC FP filter module includes an up-layer LC FP filter module and a down-layer LC FP filter module, the up-layer LC FP filter module includes a plurality of up-layer LC FP filter units, the down-layer LC FP filter module includes a plurality of down-layer LC FP filter units, the double layer LC FP filter module includes a plurality of main pixels arranged in a matrix, each of the main pixels includes two sub-pixels, each of the sub-pixels includes one up-layer LC FP filter units and one down-layer LC FP filter units stacked together, the two sub-pixels of the main pixels are independently driven such that transmission light having two chromaticity is obtained when the white transmission light having the continuous spectrum provided by the backlight module passes through the two sub-pixels, and the chromaticity of the main pixels is obtained by mixing the transmission light having the two chromaticity;

wherein the up-layer LC FP filter unit includes a first down-layer glass substrate, a first down-layer electrode and a driving circuit arranged above the first down-layer glass substrate, a first down-layer multi-layer dielectric reflective film arranged above the first down-layer electrode and the driving circuit, a first down-layer alignment film arranged above the first down-layer multi-layer dielectric reflective film, a first LC layer arranged above the first down-layer alignment film, a first up-layer alignment film arranged above the first LC layer, a first up-layer multi-layer dielectric reflective film arranged above the first up-layer alignment film, a first up-layer electrode arranged above the first up-layer multi-layer dielectric reflective film, and a first up-layer glass substrate arranged above the first up-layer electrode; and wherein the down-layer LC FP filter units includes a second down-layer glass substrate, a second down-layer electrode and the driving circuit arranged above the second down-layer glass substrate, a second down-layer multi-layer dielectric reflective film arranged above the second down-layer electrode and the driving circuit, a second down-layer alignment film arranged above the second down-layer multi-layer dielectric reflective film, a second LC layer arranged above the second down-layer alignment film, a second up-layer alignment film arranged above the second LC layer, a second up-layer multi-layer dielectric reflective film arranged above the second up-layer alignment film, a second up-layer electrode arranged above the second up-layer multi-layer dielectric reflective film, and a second up-layer glass substrate arranged above the second up-layer electrode.

A pretilt direction of the liquid crystal in the first LC layer is opposite to the pretilt direction of the liquid crystal in the second LC layer.

A transmission enhanced film arranged between the backlight module and the double layer LC FP filter modules.

A first insulation layer is arranged between the first LC layers of the up-layer LC FP filter units of two adjacent sub-pixels.

A second insulation layer is arranged between the second LC layers of the down-layer LC FP filter units of two adjacent sub-pixels.

The backlight module includes a backlight source and a light guiding plate, the backlight source emits white lights with continuous spectrum, and after passing through the light guiding plate, the white transmission light having continuous spectrum is provided to the double layer LC FP filter module.

In view of the above, instead of adopting conventional polarizers and color filtering sheet, the double layer LC FP filter display device, incorporates the backlight module and the double layer LC FP filter module to perform the color modulation such that the optical efficiency of the backlight module is enhanced. By providing white transmission lights having continuous spectrum from the white light source and driving the two sub-pixels of each of the main pixel, a wide color range is achieved. The two sub-pixels of the main pixel are independently driven such that the peak wavelength and the transmission rate of the transmission spectrum are adjustable, which further enhances the optical efficiency of the backlight module. In addition, by arranging the alignment film, the pretilt direction of the liquid crystal within the liquid crystal layers of the up-layer and the down-layer of the LC FP filter units are opposite. Thus, the general color shift of the intervening optical components is compensated such that the display performance is enhanced.

In order to further understand the characteristics of the invention as well as technical content, see the following detailed description of the present invention and the accompanying drawings, drawings, however, for reference purposes only and description of use is not intended to limit the present invention.

BRIEF DESCRIPTION OF THE DRAWINGS

Below in conjunction with the accompanying drawings, through a specific embodiment of the present invention is described in detail, and will make apparent the technical solution of the present invention, and other beneficial effects.

DETAILED DESCRIPTION OF THE EMBODIMENTS

Embodiments of the invention will now be described more fully hereinafter with reference to the accompanying drawings, in which embodiments of the invention are shown.

Figure 1:
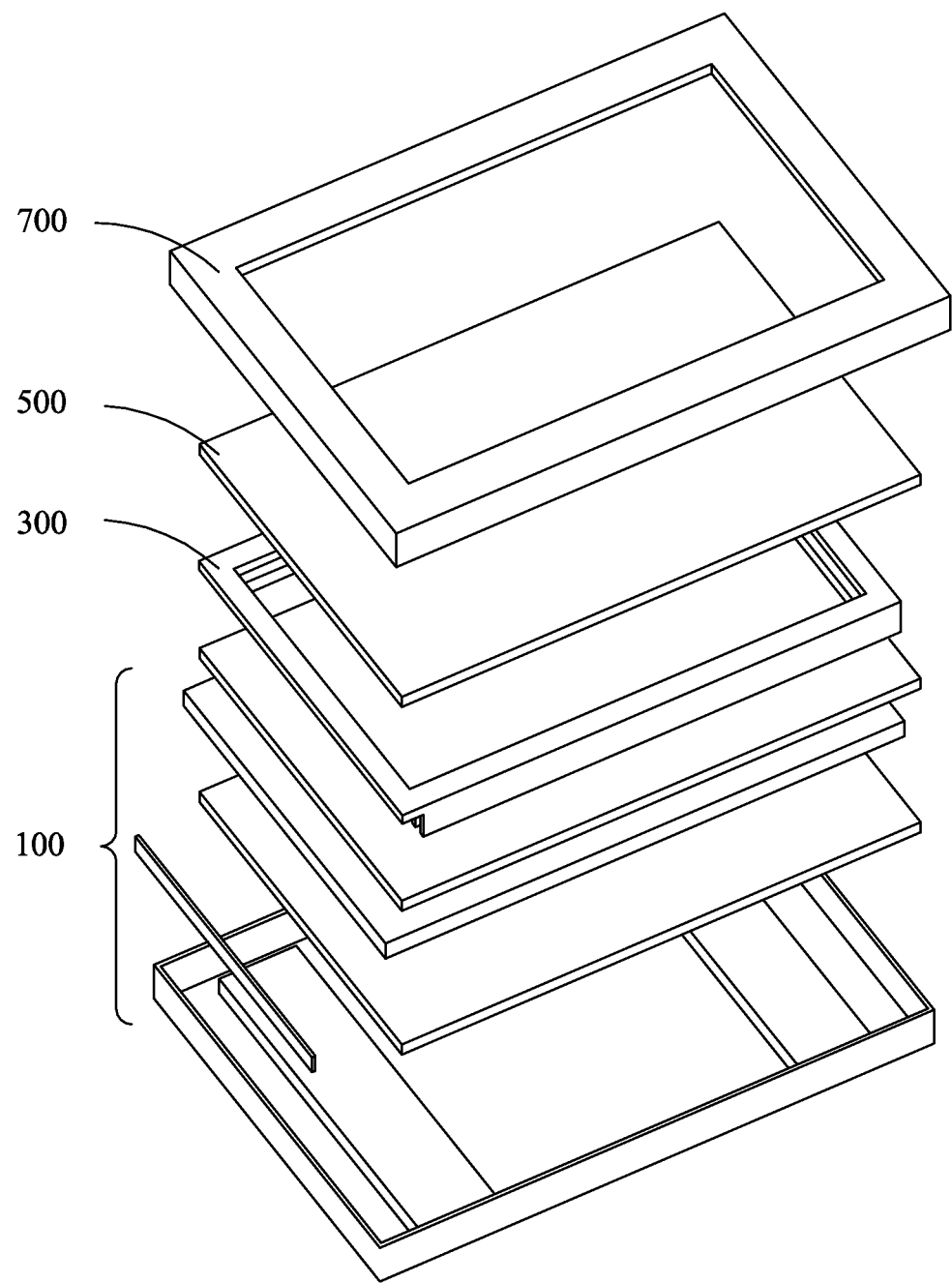
FIG. 1 is an exploded view of the conventional LCD.
Figure 2:
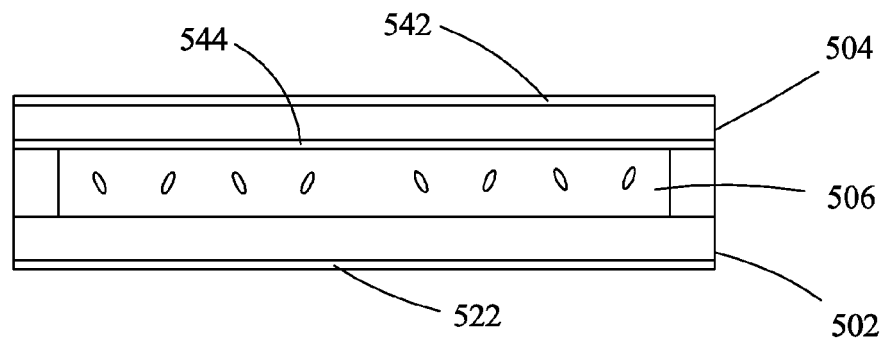
FIG. 2 is a schematic view of the conventional liquid crystal panel.
Figure 3:
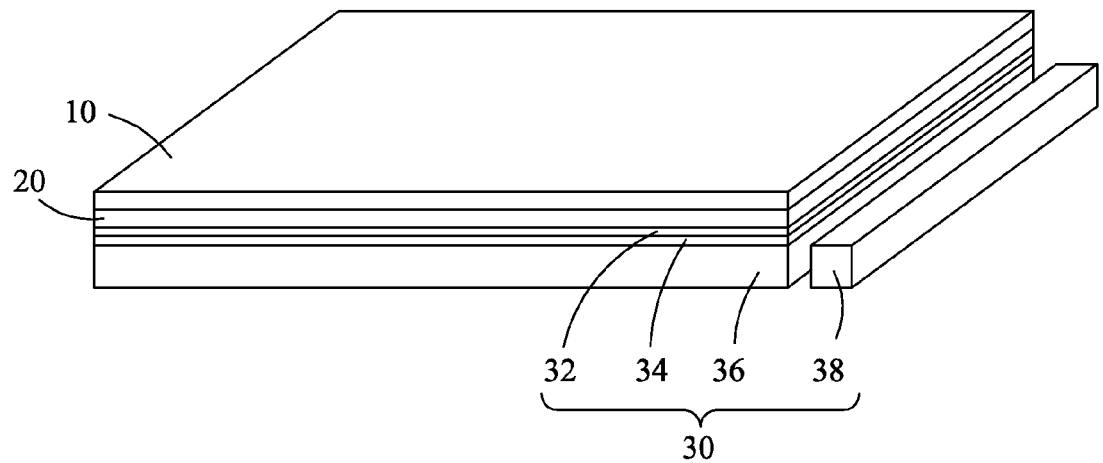
FIG. 3 is a schematic view of a conventional double layer LC FP filter display device.
Figure 4:
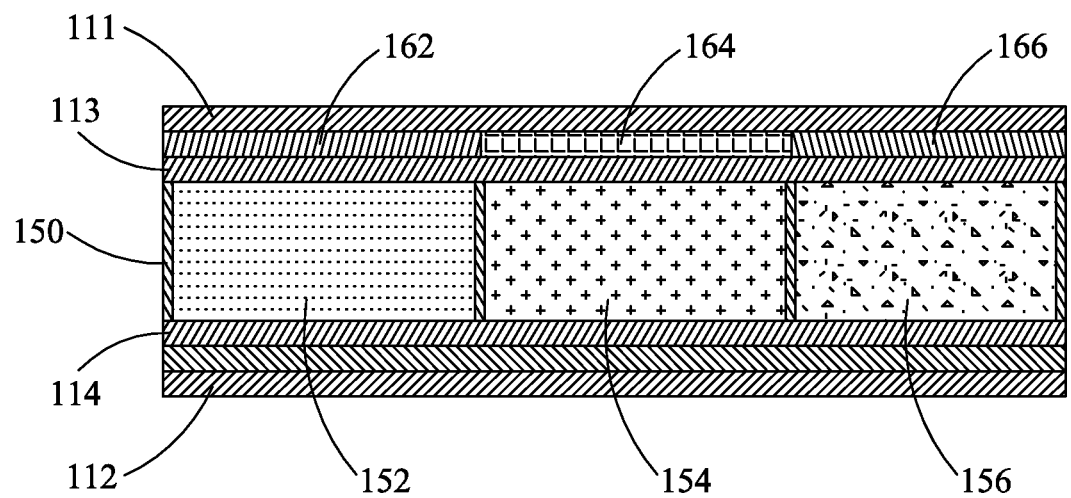
FIG. 4 is a schematic view of the pixel cell of FIG. 3.
Figure 5:
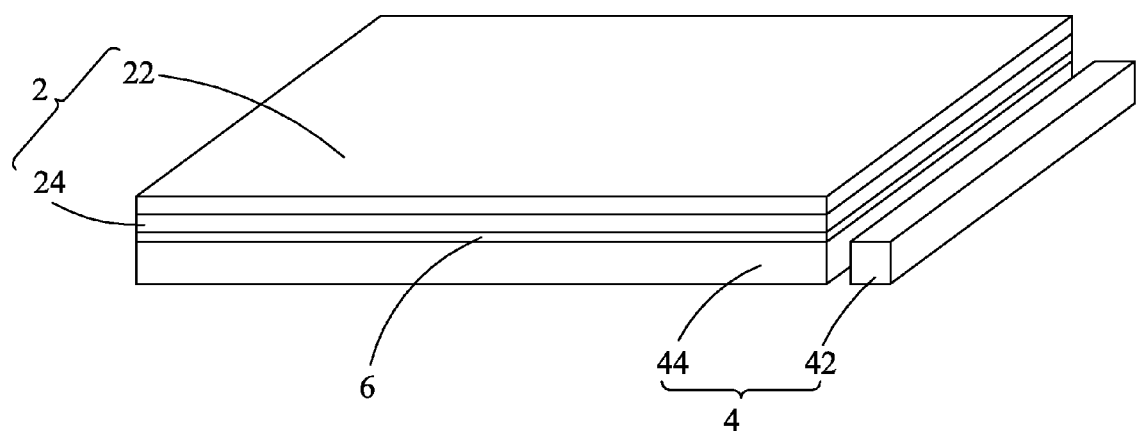
FIG. 5 is a schematic view showing the three-dimension structure of the double layer LC FP filter display device in accordance with one embodiment.
Figure 6:
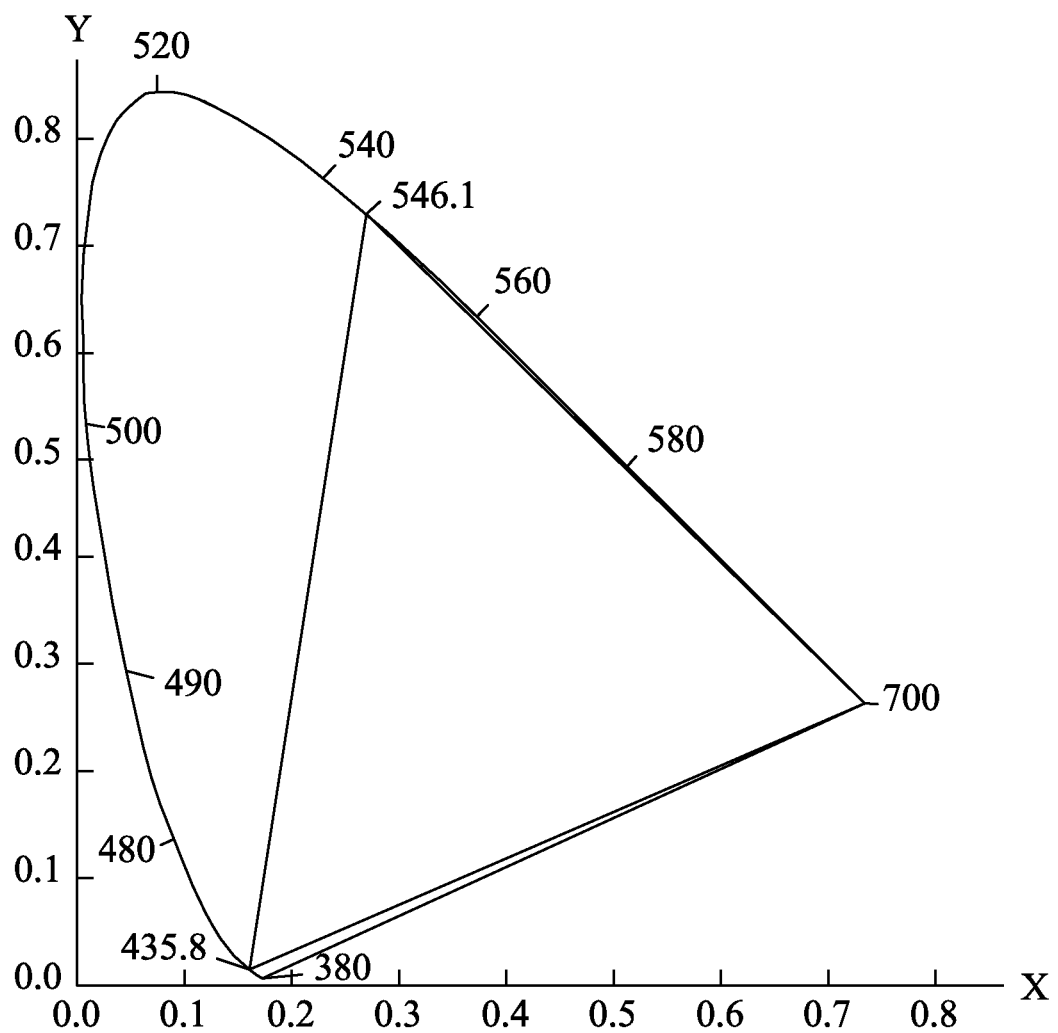
FIG. 6 is a chromaticity diagram of CIE1931.
Figure 7:
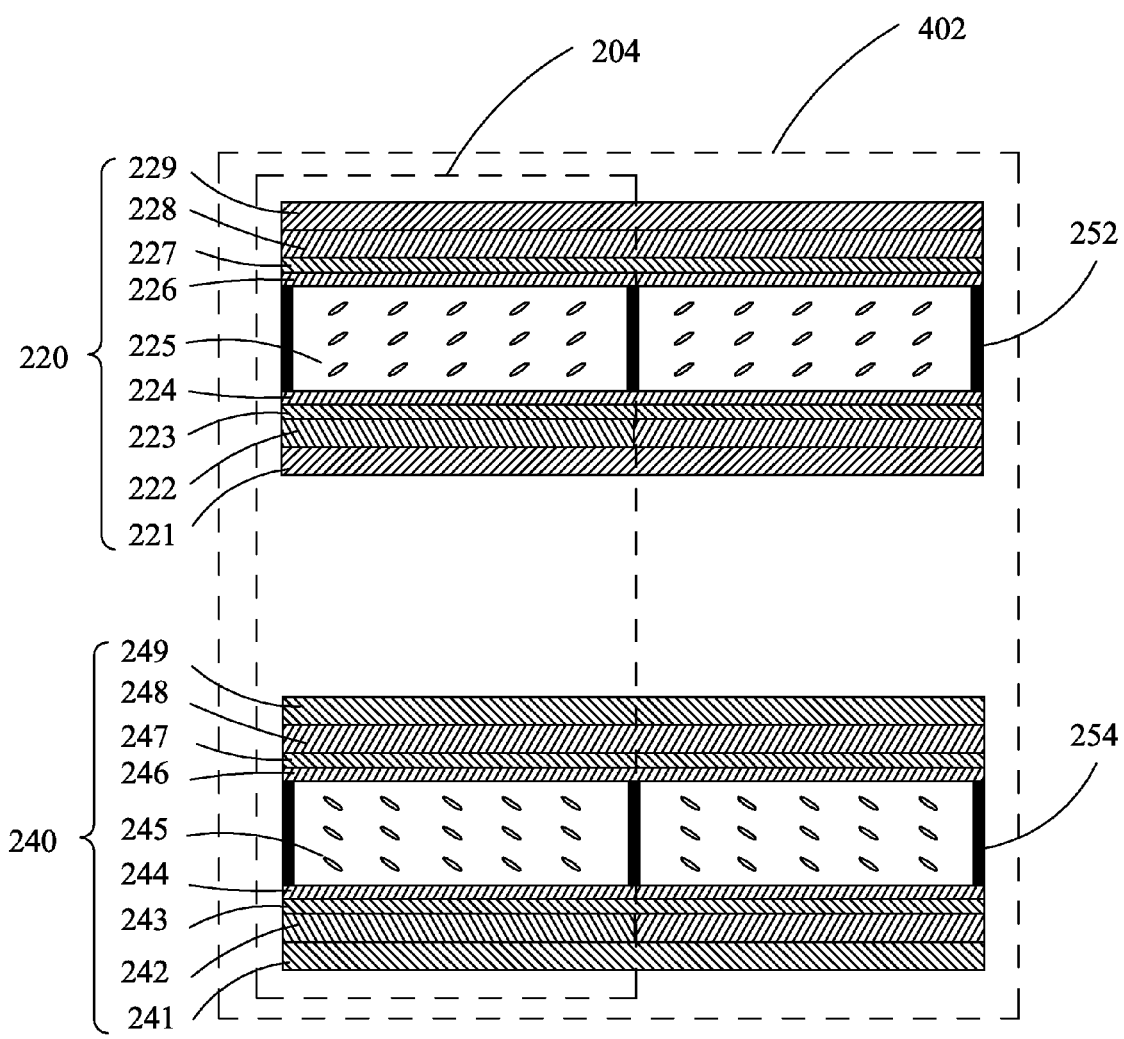
FIG. 7 is a schematic view of the main pixel of the double layer LC FP filter display device in accordance with one embodiment.

FIGS. 5 to 7 show the double layer LC FP filter display device ("display device") in accordance with one embodiment. The display device includes a backlight module 4, and a double layer LC FP filter module 2 arranged above the backlight module. The backlight module 4 provides white transmission light with continuous spectrum for the double layer LC FP filter module 2. The double layer LC FP filter module 2 is for color modulation. The double layer LC FP filter module 2 controls the color and intensity of the transmission light such that the conventional polarizer and the color filtering sheet can be omitted. As such, the light utilization efficiency of the backlight module 4 is enhanced.

The double layer LC FP filter module 2 includes an up-layer LC FP filter module 22 and a down-layer LC FP filter module 24. The up-layer LC FP filter module 22 includes a plurality of up-layer LC FP filter units 220, and the down-layer LC FP filter module 24 includes a plurality of down-layer LC FP filter units 240.

In one embodiment, the double layer LC FP filter module 2 includes a plurality of main pixels 402 arranged in a matrix. Each of the main pixels 402 includes two sub-pixels 204. Each of the sub-pixels 204 includes one up-layer LC FP filter units 220 and one down-layer LC FP filter units 240 stacked together. The two sub-pixels 204 of the main pixels 402 are independently driven and the peak wavelength and the transmission rate of the transmission spectrum are controllable. As such, the transmission light having two chromaticity is obtained when the white transmission light having the continuous spectrum provided by the backlight module 4 passes through the two sub-pixels 204. Afterward, the chromaticity of the main pixels 402 is obtained by mixing the transmission light having two chromaticity.

According to the complementary color rule and intermediate color rule of the Grassman's law, the outlook of the mixed color continuously changes when one of the color continuously changes. As such, by controlling the driving voltage of one of the sub-pixels 204, the peak wavelength and the transmission rate of the transmission spectrum are changed As such, the chromaticity of the transmission lights of the sub-pixels 204 is changed, and so does the chromaticity of the main pixels 402. In addition, by controlling the driving voltages of the two sub-pixels 204, the chromaticity of the transmission lights of the two sub-pixels 204 are changes to obtain the main pixels 402 with more chromaticity. In this way, the colorful display of the double layer LC FP filter display device is realized.

FIG. 6 is a chromaticity diagram of CIE1931. When the chromaticity coordinates of the two sub-pixels 204 of the main pixel 402 are in an periphery of the chromaticity curve, the color range of the main pixel 402 is able to cover the CIE1931 color space. Comparing to the current color space formed by the main pixel of RGB primary colors (as indicated by the triangle of FIG. 6), the color space of the claimed invention has a better display performance.

Specifically, referring to FIG. 7, each of the up-layer LC FP filter units 220 includes a first down-layer glass substrate 221, a first down-layer electrode and a driving circuit 222 arranged above the first down-layer glass substrate 221, a first down-layer multi-layer dielectric reflective film 223 arranged above the first down-layer electrode and the driving circuit 222, a first down-layer alignment film 224 arranged above the first down-layer multi-layer dielectric reflective film 223, a first LC layer 225 arranged above the first down-layer alignment film 224, a first up-layer alignment film 226 arranged above the first LC layer 225, a first up-layer multi-layer dielectric reflective film 227 arranged above the first up-layer alignment film 226, a first up-layer electrode 228 arranged above the first up-layer multi-layer dielectric reflective film 227, and a first up-layer glass substrate 229 arranged above the first up-layer electrode 228.

Each of the down-layer LC FP filter units 240 includes a second down-layer glass substrate 241, a second down-layer electrode and the driving circuit 242 arranged above the second down-layer glass substrate 241, a second down-layer multi-layer dielectric reflective film 243 arranged above the second down-layer electrode and the driving circuit 242, a second down-layer alignment film 244 arranged above the second down-layer multi-layer dielectric reflective film 243, a second LC layer 245 arranged above the second down-layer alignment film 244, a second up-layer alignment film 246 arranged above the second LC layer 245, a second up-layer multi-layer dielectric reflective film 247 arranged above the second up-layer alignment film 246, a second up-layer electrode 248 arranged above the second up-layer multi-layer dielectric reflective film 247, and a second up-layer glass substrate 249 arranged above the second up-layer electrode 248.

The backlight module 4 provides white transmission light with continuous spectrum. The white transmission light passes through the down-layer LC FP filter units 240 and the up-layer LC FP filter units 220 in turn. After being filtered, the transmission light with a specific chromaticity is obtained.

The chromaticity of the main pixel 402 is obtained by mixing the transmission lights with two specific chromaticity. The liquid crystal in the second LC layer 245 are twisted in response to the driving of the second up-layer electrode 248, the second down-layer electrode and the driving circuit 242. The white transmission light with continuous spectrum passing through the second LC layer 245 is selected such that the chromaticity of the transmission light passing through the second LC layer 245 changes. Afterward, the white transmission light is selected by the first LC layer 225 such that the chromaticity of the transmission light of the sub-pixels 204 is the one needed.

The first down-layer alignment film 224, and the first up-layer alignment film 226 are for performing alignment for the liquid crystal in the first LC layer 225. The second down-layer alignment film 244, and the second up-layer alignment film 246 are for performing the alignment for the liquid crystal in the second LC layer 245. Preferably, the pretilt direction of the liquid crystal in the first LC layer 225 is opposite to that of the liquid crystal in the second LC layer 245 so as to compensate the general color shift of intervening optical components.

Specifically, a first insulation layer 252 is arranged between the first LC layers 225 of the up-layer LC FP filter units 220 of two adjacent sub-pixels, and a second insulation layer 254 is arranged between the second LC layers 245 of the down-layer LC FP filter units 240 of two adjacent sub-pixels.

It is to be noted that the backlight module 4 is the edge-type backlight module. The backlight module 4 includes a backlight source 42 and a light guiding plate 44. The backlight source 42 emits white lights with continuous spectrum. After passing through the light guiding plate 44, the white transmission lights having continuous spectrum is provided to the double layer LC FP filter module 2. The backlight source 42 can be the generally adopted backlight source emitting white lights.

In view of the above, instead of adopting conventional polarizers and color filtering sheet, the double layer LC FP filter display device, incorporates the backlight module and the double layer LC FP filter module to perform the color modulation such that the optical efficiency of the backlight module is enhanced. By providing white transmission lights having continuous spectrum from the white light source and driving the two sub-pixels of each of the main pixel, a wide color range is achieved. The two sub-pixels of the main pixel are independently driven such that the peak wavelength and the transmission rate of the transmission spectrum are adjustable, which further enhances the optical efficiency of the backlight module. In addition, by arranging the alignment film, the pretilt direction of the liquid crystal within the liquid crystal layers of the up-layer and the down-layer of the LC FP filter units are opposite. Thus, the general color shift of the intervening optical components is compensated such that the display performance is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A double layer liquid crystal (LC) Fabry-Perot (FP) filter display device, comprising:

a backlight module and a double layer LC FP filter module arranged above the backlight module, the backlight module provides white transmission light with continuous spectrum for the double layer LC FP filter module, the double layer LC FP filter module comprises an up-layer LC FP filter module and a down-layer LC FP filter module, the up-layer LC FP filter module comprises a plurality of up-layer LC FP filter units, the down-layer LC FP filter module comprises a plurality of down-layer LC FP filter units, the double layer LC FP filter module comprises a plurality of main pixels arranged in a matrix, each of the main pixels comprises two sub-pixels, each of the sub-pixels comprises one up-layer LC FP filter units and one down-layer LC FP filter units stacked together, the two sub-pixels of the main pixels are independently driven by a driving circuit to obtain the transmission light having two chromaticity when continuous spectrum emitted from the backlight module passes through the two sub-pixels; and wherein the up-layer LC FP filter module comprises a first LC layer, the down-layer LC FP filter module comprises a second LC layer, a pretilt direction of liquid crystals in the first LC layer is opposite to the pretilt direction of the liquid crystals in the second LC layer; a peak wavelength and a transmission rate of the main pixels are modulated by mixing the transmission lines with various combinations of the two chromaticity in response to the driving circuit, such that a polarizer and a color filter are not required.

2. The double layer LC FP filter display device as claimed in claim 1, wherein the up-layer LC FP filter unit comprises a first down-layer glass substrate, a first down-layer electrode and a driving circuit arranged above the first down-layer glass substrate, a first down-layer multi-layer dielectric reflective film arranged above the first down-layer electrode and the driving circuit, a first down-layer alignment film arranged above the first down-layer multi-layer dielectric reflective film, the first LC layer arranged above the first down-layer alignment film, a first up-layer alignment film arranged above the first LC layer, a first up-layer multi-layer dielectric reflective film arranged above the first up-layer alignment film, a first up-layer electrode arranged above the first up-layer multi-layer dielectric reflective film, and a first up-layer glass substrate arranged above the first up-layer electrode.

3. The double layer LC FP filter display device as claimed in claim 2, wherein the down-layer LC FP filter units comprises a second down-layer glass substrate, a second down-layer electrode and the driving circuit arranged above the second down-layer glass substrate, a second down-layer multi-layer dielectric reflective film arranged above the second down-layer electrode and the driving circuit, a second down-layer alignment film arranged above the second down-layer multi-layer dielectric reflective film, the second LC layer arranged above the second down-layer alignment film, a second up-layer alignment film arranged above the second LC layer, a second up-layer multi-layer dielectric reflective film arranged above the second up-layer alignment film, a second up-layer electrode arranged above the second up-layer multi-layer dielectric reflective film, and a second up-layer glass substrate arranged above the second up-layer electrode.

4. The double layer LC FP filter display device as claimed in claim 1, further comprises a transmission enhanced film arranged between the backlight module and the double layer LC FP filter modules.

5. The double layer LC FP filter display device as claimed in claim 1, wherein a first insulation layer is arranged between the first LC layers of the up-layer LC FP filter units of two adjacent sub-pixels.

6. The double layer LC FP filter display device as claimed in claim 1, wherein a second insulation layer is arranged between the second LC layers of the down-layer LC FP filter units of two adjacent sub-pixels.

7. The double layer LC FP filter display device as claimed in claim 1, wherein the backlight module comprises a backlight source and a light guiding plate, the backlight source emits white lights with continuous spectrum, and after passing through the light guiding plate, the white transmission light having continuous spectrum is provided to the double layer LC FP filter module.

8. A double layer LC FP filter display device, comprising:
a backlight module and a double layer LC FP filter module arranged above the backlight module, the backlight module provides white transmission light with continuous spectrum for the double layer LC FP filter module, the double layer LC FP filter module comprises an up-layer LC FP filter module and a down-layer LC FP filter module, the up-layer LC FP filter module comprises a plurality of up-layer LC FP filter units, the down-layer LC FP filter module comprises a plurality of down-layer LC FP filter units, the double layer LC FP filter module comprises a plurality of main pixels arranged in a matrix, each of the main pixels comprises two sub-pixels, each of the sub-pixels comprises one up-layer LC FP filter units and one down-layer LC FP filter units stacked together, the two sub-pixels of the main pixels are independently driven by a driving circuit to obtain the transmission light having two chromaticity when continuous spectrum emitted from the backlight module passes through the two sub-pixels;

wherein the up-layer LC FP filter unit comprises a first down-layer glass substrate, a first down-layer electrode and a driving circuit arranged above the first down-layer glass substrate, a first down-layer multi-layer dielectric reflective film arranged above the first down-layer electrode and the driving circuit, a first down-layer alignment film arranged above the first down-layer multi-layer dielectric reflective film, a first LC layer arranged above the first down-layer alignment film, a first up-layer alignment film arranged above the first LC layer, a first up-layer multi-layer dielectric reflective film arranged above the first up-layer alignment film, a first up-layer electrode arranged above the first up-layer multi-layer dielectric reflective film, and a first up-layer glass substrate arranged above the first up-layer electrode; and wherein the down-layer LC FP filter units comprises a second down-layer glass substrate, a second down-layer electrode and the driving circuit arranged above the second down-layer glass substrate, a second down-layer multi-layer dielectric reflective film arranged above the second down-layer electrode and the driving circuit, a second down-layer alignment film arranged above the second down-layer multi-layer dielectric reflective film, a second LC layer arranged above the second down-layer alignment film, a second up-layer alignment film arranged above the second LC layer, a second up-layer multi-layer dielectric reflective film arranged above the second up-layer alignment film, a second up-layer electrode arranged above the second up-layer multi-layer dielectric reflective film, and a second up-layer glass substrate arranged above the second up-layer electrode, and wherein a pretilt direction of liquid crystals in the first LC layer is opposite to the pretilt direction of the liquid crystals in the second LC layer; a peak wavelength and a transmission rate of the main pixels are modulated by mixing the transmission lines with various combinations of the two chromaticity in response to the driving circuit, such that a polarizer and a color filter are not required.

9. The double layer LC FP filter display device as claimed in claim 8, further comprises a transmission enhanced film arranged between the backlight module and the double layer LC FP filter modules.

10. The double layer LC FP filter display device as claimed in claim 8, wherein a first insulation layer is arranged between the first LC layers of the up-layer LC FP filter units of two adjacent sub-pixels.

11. The double layer LC FP filter display device as claimed in claim 8, wherein a second insulation layer is arranged between the second LC layers of the down-layer LC FP filter units of two adjacent sub-pixels.

12. The double layer LC FP filter display device as claimed in claim 8, wherein the backlight module comprises a backlight source and a light guiding plate, the backlight source emits white lights with continuous spectrum, and after passing through the light guiding plate, the white transmission light having continuous spectrum is provided to the double layer LC FP filter module.

\* \* \* \* \*